March 29, 1966 R. A. MILLER ETAL 3,243,517

TELEPHONE CALL TRANSMITTER

Filed Oct. 5, 1962 3 Sheets-Sheet 1

INVENTORS R. A. MILLER
C. M. TARIS

BY E. J. Oluder

ATTORNEY

TELEPHONE CALL TRANSMITTER

Filed Oct. 5, 1962 3 Sheets-Sheet 2

INVENTORS R. A. MILLER
C. M. TARIS
BY
ATTORNEY

INVENTORS R. A. MILLER
C. M. TARIS
BY E. J. Olinder
ATTORNEY 3,243,517

TELEPHONE CALL TRANSMITTER

Robert A. Miller, Plainfield, and Charles M. Taris, Cranford, N.J., assignors to Bell Telephone Laboratories, Incorporated, New York, N.Y., a corporation of New York Filed Oct. 5, 1962, Ser. No. 228,581
19 Claims. (Cl. 179—90)

This invention relates to telephone dialing systems, and more particularly to repertory dialers which handle multifrequency dialing information.

Repertory dialers are automatic telephone call transmitters which enable subscribers to initiate calls by exercising only a minimum of mechanical manipulation, for example, depressing a single key as opposed to dialing manually each digit of the called party's number. Basically such devices comprise a register which initially stores one or more directory numbers and subsequently, when a call is to be placed, selectively introduces these numbers to the telephone line for transmission to a central office. Because of the dual advantages of simplicity and reliability, registers in this type of equipment are commonly of the magnetic drum variety in which the wave form of the data stored on the drum is a replica of the wave form of the data transmitted to the central office. In other words, if the central office is equipped to handle interrupted direct-current pulses of the type generated by a standard rotary dial, the information stored on the drum comprises series of rectangular pulses. One example of a repertory dialer of this type is disclosed in U.S. Patent 2,953,647 granted to A. E. Johanson on September 20, 1960.

With the advent of electronic central office switching systems which utilize multifrequency type dialing equipment, attempts have been made to perfect a compatible repertory dialer which is both structurally and operationally similar to dialers used in previous systems. Consequently, dialers have been designed to record the various combinations of tones representing dialed digits directly on the drum or other storage media, and then upon command, to sense these recorded tones and apply them to the line. One example of such a device is disclosed in copending U.S. patent application Serial No. 12,440 filed by L. A. Hohmann, Jr., et al. on March 2, 1960, now Patent No. 3,128,151.

As those familiar with the station aspects of multifrequency dialing are aware, the speech circuit of a station set as well as the multifrequency dialing oscillator is coupled to the line during dialing. Consequently, background noise spuriously introduced to the line by the speech circuit is received at the central office concurrently with the multifrequency dialing tones. As a result, the central office signaling receivers must be designed for maximum selectivity, i.e., extremely narrow band widths, in order to prevent false operation of the switching equipment, so-called "talk off," in response to the aforementioned spurious signals. Ideally, the band widths of the central office receivers are limited to the drift of the subscriber's multifrequency oscillator plus any drift attributable to the transmission equipment connecting the station to the central office. Such an arrangement, however, provides no margin for additional distortion added to the dialing information by the recorder and associated amplification circuitry of a repertory dialer. Thus, even though a repertory dialer is constructed with high precision components, is designed to incorporate the most sophisticated frequency correcting arrangements and includes equipment to synchronize accurately recording speed with read-out speed, still the reliability of such a device inherently falls short of ideal. Furthermore, even though the foregoing refinements might eventually reduce distortion to an acceptable level, the additional expense involved in such arrangements would undoubtedly render such dialers commercially unacceptable.

Accordingly, it is one object of this invention to eliminate completely in repertory dialers the distortion introduced to multifrequency dial signals.

It is another object of this invention to obviate the need in multifrequency repertory dialers for high resolution tone recorders and highly selective read-in and read-out amplifiers.

It is another object of this invention to generate undistorted multifrequency dialing signals with a repertory dialer employing relatively low tolerance, nonfrequency selective components throughout.

It is still another object of this invention to reduce the cost and at the same time increase the reliability of multifrequency-type repertory dialers.

A further object of the invention is to reduce the size and hence the cost of the recording mechanism in a repertory dialer for a given collection of directory numbers.

These and other objects of the invention are accomplished, broadly, by the provision of an automatic call transmitter, adapted for use in conjunction with multifrequency dialing systems, in which indicia of the multifrequency dialing tones, as opposed to the tones per se, are recorded, and a multifrequency generating device responsive to the stored indicia is provided to reconstitute the tones for transmission to a telephone office.

One feature of the invention resides in a switching arrangement for encoding and recording digits selected by a pushbutton dialing mechanism.

Another feature of the invention pertains to a circuit for generating multifrequency dialing tones in accordance with digitally encoded data.

Another feature of the invention involves an arrangement in which coded information stored in a recorder is sensed and applied to activate selectively a multifrequency oscillator.

Still another feature of the invention resides in a multifrequency generating circuit adapted to be operative in response to either manual manipulation of a pushbutton dialing mechanism or the application of electrical signals from a digit register.

The invention also features a read-out timing arrangement which compensates for nonuniformities in the digit recording process.

Yet another feature of the invention enables the transmission of dialed digits to be automatically halted prior to the reception of a signal indicating that dialing may proceed.

The foregoing and other objects and features of the invention will be more thoroughly understood by reference to the following detailed description of an illustrative repertory dialer embodying the invention, in conjunction with the accompanying drawing of which:

Figure 1:
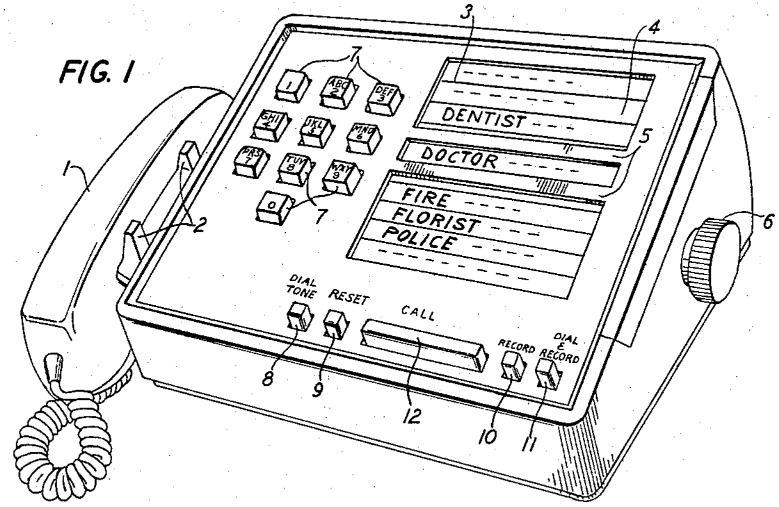
FIG. 1 is a perspective view of a subscriber station unit comprising a pushbutton dial telephone set and a repertory dialer incorporating the invention housed in a single cabinet.

With reference now directed to the drawing, FIG. 1 shows one embodiment of a subscriber's station unit comprising both a telephone set and repertory dialer housed in a single cabinet. Associated with the telephone portion of the unit is a handset 1 which when not in use is supported by a pair of cradle arms 2. In the arrangement of the invention described herein, the cradle arms 2 protrude from one side of the housing and operate a conventional switchhook mechanism in the usual manner. Associated with the repertory dialing portion of the unit is a frame 3 exposing a sliding conveyor 4 to which are fastened a plurality of name plates forming an index of the stored directory numbers. Projecting horizontally across the frame 3 are a pair of bars 5 which form a window having the vertical width of a single name plate. A selector knob 6 extending from the side of the cabinet remote from handset 1 is internally coupled with the conveyor structure to enable a subscriber to position the proper name plate between bars 5 before initiating a call via the repertory dialer. One example of a knob-operated conveyor structure particularly adapted to use in a repertory dialer of the type described herein is disclosed in our copending application Serial No. 202,560 filed June 14, 1962, now Patent No. 3,190,650.

Protruding from the upper face of the cabinet is an array of nonlocking plungers 7 which serve as a pushbutton type dial for the unit. Plungers 7 are mechanically linked to the multifrequency oscillator of FIG. 2 to produce, as described in copending U.S. patent application Serial No. 859,936, filed by L. A. Meacham on December 16, 1959, now Patent No. 3,133,155, frequencies for each different plunger. An illustrative pushbutton mechanism comprising a mechanical linkage capable of actuating the multifrequency oscillator of FIG. 2 as specified above is disclosed in the copending application of C. E. Mitchell, R. E. Prescott, L. Schenker, D. G. Tweed, Serial No. 860,549, filed December 18, 1959 now Patent No. 3,109,071.

Protruding from the face of the cabinet immediately below frame 3 are a plurality of nonlocking keys 8 through 11 and a bar 12 which, as labeled, represent the various operating modes of the dialer. Key 10, the record key, is depressed preparatory to the storage of a new directory number in the repertory register. A reset key 9 is provided for restoring the dialer to an initial condition after a number has been stored in the repertory register. Dial tone key 8 is depressed for storage of a directory number comprising a prefix, for example the digit 9, and a suffix, the directory number of the called party, between which a dial tone signal from the central office must be received indicating that it is permissible to complete dialing. To store a directory number of this type the record key 10 is first depressed to condition the dialer for a storage cycle. Thereafter, in the following sequence, the prefix is dialed, key 8 is depressed, and finally the directory number of the called party is dialed. Key 11, the dial and record key, is provided to effect both manual dialing of an outgoing call and at the same time storage of the dialed directory number in the repertory register for future automatic dialing.

To initiate outgoing calls with the dialer, knob 6 is first turned until the name plate of the party being called is positioned between bars 5, handset 1 is lifted from its cradle, and call bar 12 is then depressed. If the number being dialed is of the type requiring an intermediate dial tone from the central office, as aforementioned, the same process indicated above is followed, except that after the appearance in the receiver of handset 1 of the intermediate signal from the central office, call bar 12 is depressed a second time.

Figure 2:
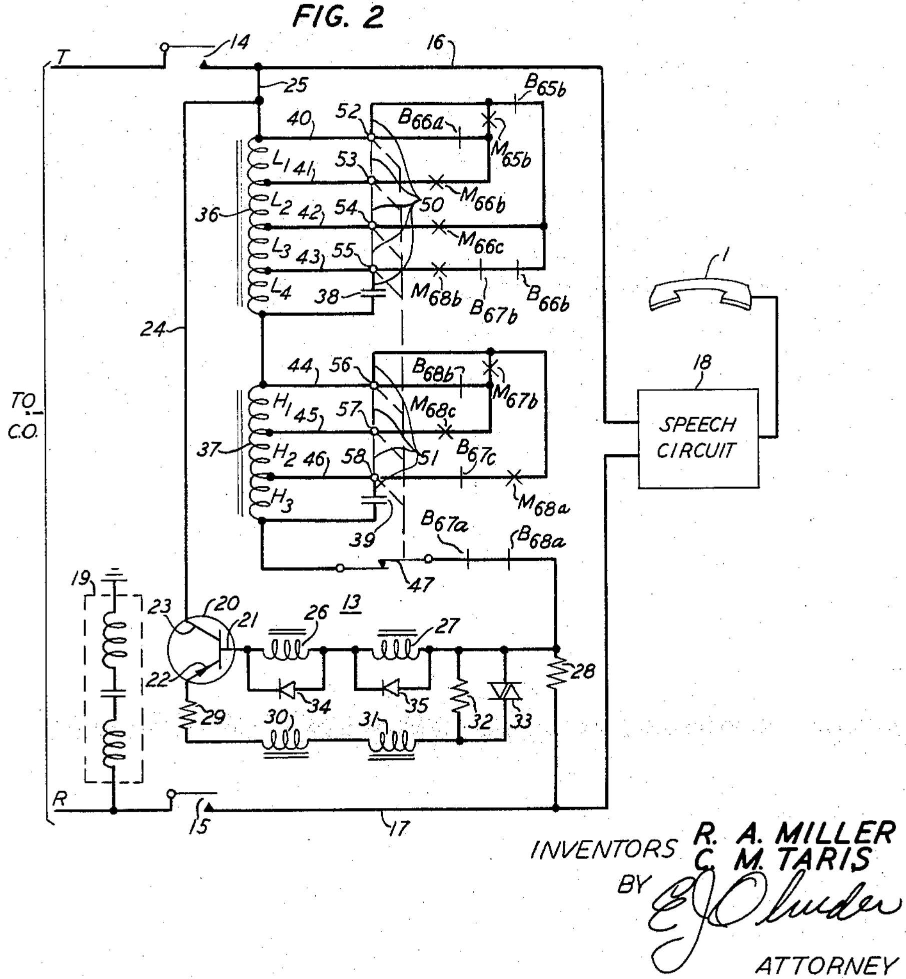
FIG. 2 is a schematic circuit diagram of the telephone portion of the station unit showing in detail the multifrequency dialing oscillator.

FIG. 2 is a circuit schematic, partially in functional block form, showing the telephone portion of the station unit including a multifrequency oscillator 13 for generating various combinations of frequencies representing the different dialed digits. As shown, a telephone line having tip and ring conductors T and R, a pair of switchhook actuated contacts 14 and 15, respectively, connected to conductors T and R, and conductors 16 and 17, respectively, connected to contacts 14 and 15, form a talking path between a conventional telephone speech circuit 18 and a central office (not shown) which is adapted to respond to multifrequency dialing signals. Connected to the R conductor on the line side of switchhook contact 15 is a ringer circuit 19 shown symbolically as a pair of series coils having an intermediate blocking capacitor. Connected to the station side of switchhook contact 14 is a multifrequency oscillator 13 comprising a transistor 20 having base, emitter and collector contacts 21, 22 and 23, respectively. As shown, collector 23 is connected to conductor 16 by conductors 24 and 25, base 21 is connected to conductor 17 through series windings 26 and 27 and resistor 28, and emitter 22 is connected to conductor 17 through resistor 29, series windings 30 and 31, the parallel combination comprising resistor 32 and varistor 33, and resistor 28. A pair of limiting diodes 34 and 35 are respectively bridged across windings 26 and 27.

Also connected to conductor 16 by conductor 25 are a pair of serially connected tuned circuits respectively comprising coils 36 and 37 and capacitors 38 and 39. As shown, the upper coil 36 is tapped into four segments, L1 through L4, by leads 40 through 43, and the lower coil 37 is tapped into three segments H1 through H3 by leads 44 through 46. The lower end of coil 37 is connected to conductor 17 by normally closed contacts 47, series break contacts $B_{67a}$ and $B_{68a}$ and resistor 28. For those not familiar with "detached contact" symbolism, "break contacts" are hereinafter defined as switch actuated circuit elements which form open circuit paths when their associated switches are operated, but are short circuit paths at all other times. Break contacts are represented pictorially by a line, or bar, drawn through the conductor in which the contacts are connected. "Make contacts," conversely, are switch actuated circuit elements which form short circuit paths when their associated switches are operated, but are open circuit paths at all other times. Make contacts are illustrated as a cross, or X, drawn through the conductor in which the contacts are connected. To aid in understanding the various sheets of drawing, the numerical and capital subscripts of the various make and break contacts designate the relay, key, or switch operating that set of contacts, and the lower case subscripts indicate particular contacts associated with that relay, key or switch. For example $B_{67a}$ symbolizes the "a" break contacts operated by relay 67.

Leads 40 through 43 and 44 through 46, respectively, are selectively connectable to capacitors 38 and 39 by a crossbar switching mechanism, such as the one disclosed in the aforementioned C. E. Mitchell et al. application, which is mechanically actuated by plungers 7 of the pushbutton dialing array. More specifically, when one of the plungers 7 is depressed, one of the leads 40 through 43 is connected to capacitor 38, one of the leads 44 through 46 is connected to capacitor 39, and normally closed contacts 47 open. Accordingly, a first tuned circuit is formed comprising capacitor 38 and either one, two, three or all four sections of coil 36, and a second tuned circuit is simultaneously formed comprising capacitor 39 and either one, two or all three sections of coils 37.

According to the invention, in addition to the crossbar switching mechanism being linked to the frequency determining elements of the oscillator, a switching matrix formed by suitably located make and break contacts is also provided to form pairs of digit-representing tuned circuits, but in response to operation of the repertory register rather than the pushbuttons of the dialing array. As shown, capacitor 38 is connected to lead 40 by conductor 50, and make contact $M_{65b}$, and break contacts $B_{66a}$ and is connected to lead 41 by conductor 50 and make contacts $M_{65b}$ and $M_{66b}$. Capacitor 38 is connected to lead 42 by conductor 50, break contacts $B_{65b}$ and make contacts $M_{66c}$, and is connected to lead 43 by conductor 50, break contacts $B_{65b}$, $B_{66b}$ and $B_{67b}$, and make contacts $M_{68b}$.

Capacitor 39 is connected to lead 44 by conductor 51, make contacts $M_{67b}$ and break contacts $B_{68b}$, and is connected to lead 45 by conductor 51 and make contacts $M_{67b}$ and $M_{68c}$. Capacitor 39 is connected to lead 46 by conductor 51 and make contacts $M_{68a}$ and break contacts $B_{67c}$.

Figures 3, 6:
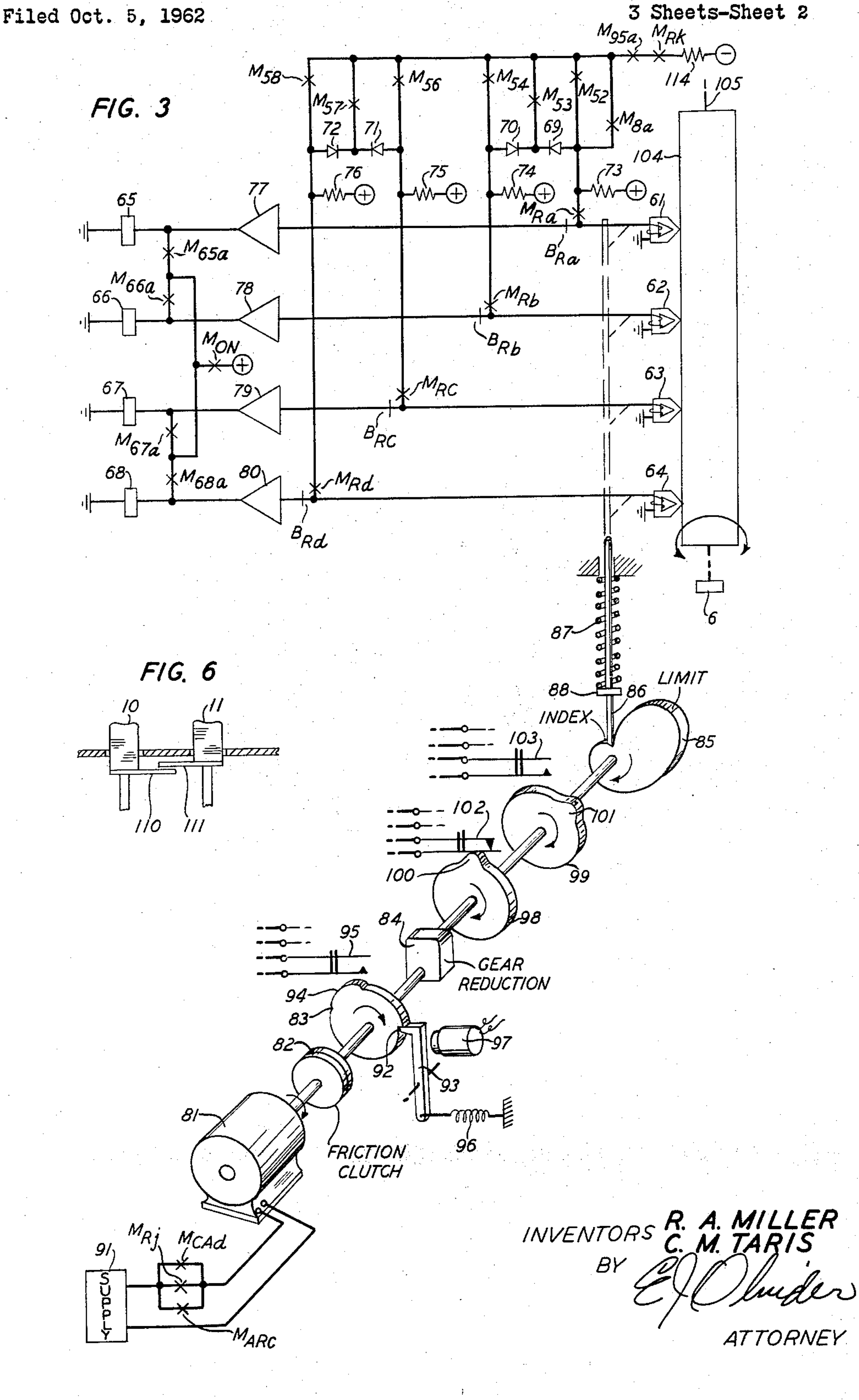
FIG. 3 illustrates the repertory register, or memory portion of the dialer.
FIG. 6 is a sectional view of the mechanical linkage between the "record" and "dial and record" keys of the station unit.

FIG. 3 illustrates the register, or memory portion of the repertory dialer. As shown, the register comprises a conventional magnetic drum 104 which is mounted to rotate about a longitudinal axis 105 and also is geared to the drive structure of name plate conveyor 4 as described in our aforementioned copending application. Accordingly, each name plate fastened to the conveyor corresponds to a separate axial segment along the surface of the drum. It should be clearly understood that the showing of a magnetic drum as a storage medium is purely illustrative, and is not intended to restrict the invention to that type of device. Four equally spaced recording heads 61 through 64 are positioned in axial alignment adjacent to the drum. The magnetizing coils of the heads are selectively connected to either an encoding matrix comprising switches $M_{52}$ through $M_{54}$ and $M_{56}$ through $M_{58}$ via make contacts $M_{Ra}$ through $M_{Rd}$, or to a decoding circuit comprising relays 65 through 68 via break contacts $B_{Ra}$ through $B_{Rd}$.

More particularly, the magnetizing coils of head 61 is connected through make contacts $M_{Ra}$, $M_{95a}$ and $M_{Rk}$ to a negative source of potential by a first path comprising make contact $M_{8a}$, a second path comprising make contact $M_{52}$, and a third path comprising diode 69 in series with make contact $M_{53}$. The magnetizing coils of head 62 is connected through make contacts $M_{Rb}$, $M_{95a}$ and $M_{Rk}$ to a negative source of potential through a first path comprising make contact $M_{54}$ and a second path comprising diode 70 in series with make contact $M_{53}$. The magnetizing coil of head 63 is connected through make contacts $M_{Rc}$, $M_{95a}$ and $M_{Rk}$ to a negative source of potential through a first path comprising make contact $M_{56}$ and a second path comprising diode 71 in series with make contact $M_{57}$. The magnetizing coil of head 64 is connected through make contact $M_{Rd}$, $M_{95a}$ and $M_{Rk}$ to a negative source of potential through a first path comprising make contact $M_{58}$ and a second path comprising diode 72 in series with make contact $M_{57}$. The magnetizing coils of heads 61 through 64 are also connected to a positive source of potential through their respective make contacts $M_{Ra-d}$ and resistors 73 through 76.

Make contacts $M_{52}$ through $M_{54}$ and $M_{56}$ through $M_{58}$ are selectively operated by plungers 7 of the dialing array in unison with the closure of crossbar contacts 52 through 58 (FIG. 2) which form the tuned circuits of the multifrequency oscillator. For example, if crosspoints 52 and 56 of the oscillator are closed by depression of one of the plungers 7, thereby forming a pair of tuned circuits severally comprising all of coil 36 and all of coil 37, make contacts $M_{52}$ and $M_{56}$ are concurrently operated. One example of a switching device capable of affecting simultaneous selective closure of both the oscillator crosspoints and make contact $M_{52}$ through $M_{53}$ is provided by slightly modifying the mechanism of the aforementioned Mitchell et al. application to include a second crossbar switch directly below the first, the shafts of plungers 7 being mechanically coupled to both switches. Make contact $M_8$ is operated directly by dial tone key 8 of FIG. 1.

The magnetizing coil of head 61 is connected to energize decoding relay 65 through a path comprising break contacts $B_{Ra}$ and amplifier 77. Similarly, the magnetizing coils of heads 62 through 64 are connected to energize decoding relays 66 through 68, respectively, through break contacts $B_{Rb-d}$ and amplifiers 78 through 80. Relays 65 through 68 are also connected to be energized via a positive source of potential through the respective make contacts $M_{65a}$ through $M_{68a}$, operated by relays 65 through 68, and a common make contact $M_{ON}$. Make contact ON is actuated by off-normal relay ON, shown in FIG. 4, which in conjunction with make contacts $M_{65a}$ through $M_{68a}$ ensures that relays 65 through 68 remain operated for a timed interval.

Heads 61 through 64 are stepped axially along the drum in unison by a motive structure comprising a driving motor 81, friction clutch 82, jumping cam 83, a reduction gear 84 and heart shaped cam 85. As shown, the rim of cam 85 spirals outwardly from an index, or starting position, and at an outer, or limit position reached in slightly less than a complete revolution of the cam, falls steeply back to the index. A follower 86 driven by cam 85 comprises a mechanical linkage which slides heads 61 through 64 along the drum. As cam 85 rotates, thereby imparting motion to follower 86, a spring 87 is compressed by a collar 88 attached to the follower. Consequently, after follower 86 has traversed the limit position on cam 85, it is urged along the steep side of the cam by spring 87, thereby returning the heads to their original position at the foot of the drum.

Motor 81 is driven by power supply 91 through three make contacts $M_{CAd}$, $M_{Rj}$, and $M_{ARc}$ connected in parallel. As will be explained in detail below, these contacts are operated in response to the CA, the R and the AR relays (FIG. 4) which are associated with the various operating modes of the dialer, e.g., call, record and reset. Jumping cam 83 comprises both a ledge 92 against which bears an arresting pawl 93 and a lobe 94 which operates a switch 95. Pawl 93 is retracted from the ledge by operation of a solenoid 97, and is pivoted back to its normal position when the solenoid is de-energized by a return spring 96. As will be explained below, the operation of solenoid 97 is determined in accordance with the switching circuitry of FIG. 4.

Also driven the shaft of heart shaped cam 85 are cams 98 and 99. Protruding from cam 98 at a rotational position corresponding to the index position on heart shaped cam 85 is a lobe 100 which operates a switch 102. Similarly, protruding from cam 99 at a rotational position corresponding to the limit position of heart shaped cam 85 is a lobe 101 which operates a switch 103. The make and break contacts actuated by switches 102 and 103 are illustrated symbolically in FIG. 4 as contacts $M_{102a}$, $M_{103a}$, $B_{102a}$ and $B_{103a}$, respectively. As shown in FIG. 3, switch 102 is in the operated condition when cam 85 is in the index position. Reduction gear 84 is adjusted to rotate heart shaped cam 85 one complete revolution per as many revolutions of jumping cam 83 as there are digits in the longest directory number capable of being stored.

Figure 4:
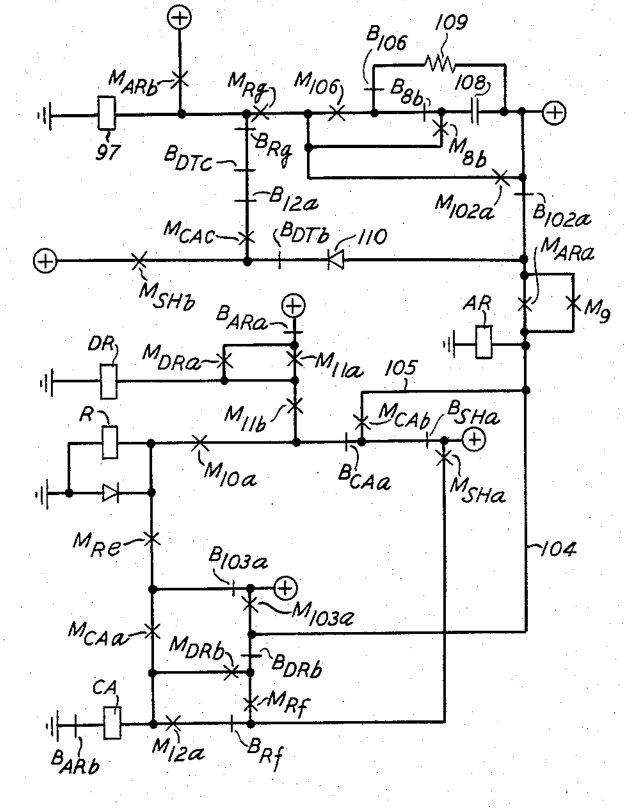
FIGS. 4 and 5 are schematic circuit diagrams, partly in detached contact convention of the control circuitry for the reportory register.

FIG. 4 is a schematic diagram of the switching circuitry controlling the operation of the repertory register of FIG. 3. As shown, the circuit comprises a record relay R which is energized by a positive source of potential through a first path comprising break contacts $B_{SHa}$ and $B_{CA}$, and a make contact $M_{10a}$, and a second path comprising break contact $B_{ARa}$ and make contacts $M_{11a}$, $M_{11b}$, and $M_{10a}$. A locking path for the R relay is provided by make contacts $M_{Re}$ and break contacts $B_{103a}$. Call relay CA, which control the dialer's calling mode of operation, is energized by a positive source of potential through a path comprising make contacts $M_{SHa}$, break contacts $B_{Rf}$, make contacts $M_{12a}$, the winding of relay CA and break contacts $B_{ARb}$. A locking path for relay CA is provided by break contacts $B_{103a}$, make contacts $M_{CAa}$, the winding of relay CA, and break contacts $B_{ARb}$. A second operating path for call relay CA comprising make contacts $M_{SHa}$, $M_{Rf}$ and $M_{DRb}$, the winding of relay CA and break contacts $B_{ARb}$ is established during the simultaneous dial and record mode of operation.

Reset relay AR functions to return recording heads 61 through 64 to their initial, or index position on the drum. Three alternative operating paths are provided for relay AR, the first comprising a positive source of potential, make contact $M_{103a}$, and conductor 104, the second comprising a positive source of potential, break contact $B_{SHa}$, make contact $M_{CAb}$ and conductor 105, and the third comprising a positive source of potential, break contact $B_{102a}$, and make contact $M_9$. A locking path comprising break contacts $B_{102a}$ and $M_{ARa}$ ensures that relay AR remains energized until break contacts $B_{102a}$ become open circuit even though reset key 9 is released prior to this time.

A relay labeled DR, is also provided to control the simultaneous "dial and record" operating mode of the dialer. As shown, the DR relay is operated over a path comprising make contacts $M_{11a}$ and break contacts $B_{ARa}$, and locks up over make contacts $M_{DRa}$ and break contacts $B_{ARa}$.

Solenoid 97, which is also shown in FIG. 3, is operated via a number of alternative paths depending upon the particular mode in which the repertory dialer is operating. As shown in FIG. 4, a first operating path for solenoid 97 comprises a positive source of potential and make contact $M_{ARb}$. A second operating path comprises a positive source of potential, timing capacitor 108, break contact $B_{8b}$, make contact M106 which is operated by each of the pushbutton dial plungers 7 acting through the same switch that operates contacts 47 of the multifrequency oscillator, and make contact $M_{Rg}$. A third path for operating solenoid 97 comprises a positive source of potential, timing capacitor 108, and make contacts $M_{8b}$ and $M_{Rg}$. A discharge path for timing capacitor 108 is provided by break contact $B_{8b}$, break contact $B_{106}$ which is operated by the same switch operating make contact $M_{106}$, and resistor 109. A fourth path for operating relay 97 is provided by a positive source of potential, make contact $M_{102a}$, and make contact $M_{Rg}$. A fifth path for operating solenoid 97 comprises a positive source of potential, break contacts $B_{102a}$, diode 110, break contacts $B_{DTb}$, make contacts $M_{CAc}$ and break contacts $B_{12a}$, $B_{DTc}$ and $B_{Rg}$. A sixth path for operating solenoid 97 comprises a positive source of potential, make contacts $M_{SHb}$ and $M_{CAc}$ and break contacts $B_{12a}$, $B_{DTc}$ and $B_{Rg}$.

Figure 5:
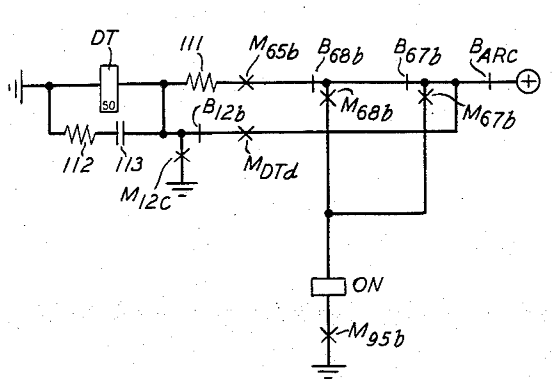

FIG. 5 is a schematic diagram of the switching circuitry which enables the dialer to transmit one or more initial (prefix) digits when call bar 12 is depressed a first time, and then stop until the call bar is depressed a second time. As shown, the switching circuitry includes a relay DT which operates over a path comprising a positive source of potential, break contacts $B_{ARc}$, break contacts $B_{67b}$ and $B_{68b}$, make contact $M_{65b}$, resistor 111 and the winding of relay DT. A shunt path comprising resistor 112 and capacitor 113 provides a slight delay in the operation of relay DT. A locking path for the DT relay is provided by a positive source of potential, break contacts $B_{ARc}$, make contacts $M_{DTd}$, break contacts $B_{12b}$, and the winding of relay DT. A discharge path for capacitor 113 is provided by make contact $M_{12c}$. Off-normal relay ON, which ensures that the repertory dialer emits multi-frequency pulses of uniform width, is energized over two alternative paths. The first of these paths comprises a positive source of potential, break contacts $B_{ARc}$, make contacts $M_{67b}$, the winding of relay ON, and make contact $M_{95b}$; and the second of these paths comprises break contacts $B_{ARc}$, break contacts $B_{67b}$ and make contacts $M_{68b}$, the winding of relay ON, and make contacts $M_{95b}$.

FIG. 6, in sectional view, illustrates a typical arrangement for impelling the "record" key downward when the "dial and record" key is depressed, but allowing the "record" key, when it is depressed, to travel downward alone. As shown, a pair of overlapping tabs 110 and 111, respectively, protrude from the bottom of keys 10 and 11. Owing to tab 111 being disposed above tab 110, key 10 enjoys unimpeded downward travel, while the downward travel of key 11 results in the mutual engagement of the tabs, thereby also forcing key 10 downward.

The various operating modes of the dialer will now be explained in detail.

*Record*

Before recording a directory number in the register, the particular name plate corresponding to that number is first positioned between bars 5 by turning knob 6. As previously mentioned, this procedure simultaneously positions adjacent to the recording heads the axial segment on the surface of the drum which corresponds to that name plate. If it is desired merely to record a number in the register, and not at the same time initiate an outgoing call to that number, record key 10 is depressed. Since an outgoing call is not to be placed, handset 1 remains in its cradle thereby leaving the make and break contacts associated with the switchhook unoperated. Accordingly, current is directed through the winding of relay R (FIG. 4) by the path comprising a positive source of potential, $B_{SHa}$, $B_{CAc}$, and the now closed make contacts $M_{10a}$. Relay R locks up through break contacts $B_{103a}$, make contacts $M_{Rc}$ and the winding of relay R.

When relay R operates, make contacts $M_{Rj}$ (FIG. 3) close and apply power from supply 91 to motor 81. Consequently, motor 81 comes up to speed but the elements following friction clutch 82 are arrested by pawl 93 which prevents rotation of jumping cam 83. With heart shaped cam 85 in the index position, as shown, lobe 100 of cam 98 operates switches 102. As a result, solenoid 97 is energized through a path comprising a positive source of potential, closed make contacts $M_{102a}$ and make contacts $M_{Rg}$. When solenoid 97 operates, pawl 93 is retracted from ledge 92 allowing clutch 82 to rotate cams 83, 98, 99 and 85 until switch 102 releases, at which time solenoid 97 is de-energized and pawl 93 is pivoted back to its original position against ledge 92. At this point cam 85, acting through follower 86, has axially shifted the recording heads to the correct position along the drum for recording the first dialed digit. It will be noted that at this time, positive potential is applied to the magnetizing coils of the recording heads through resistors 73, 74, 75 and 76, and make contacts $M_{Ra\text{-}d}$. Accordingly, the portion of the drum directly adjacent the heads are magnetized uniformly in one direction. Preferably, the magnitude of this positive potential is sufficient to saturate the affected area of the drum.

As previously mentioned, plungers 7 of the pushbutton dial are linked to a switching mechanism which closes a distinct combination of make contacts M52 through M54 and M56 through M58 for each dialed digit. Listed below is a table showing the combination of operated make contacts and the combination of recording heads energized for each dialed digit.

| Digit | Operated Make Contacts | Recording Heads Energized |
|---|---|---|
| 1 | M52, M56 | 61, 63. |
| 2 | M52, M57 | 61, 63, 64. |
| 3 | M52, M58 | 61, 64. |
| 4 | M53, M56 | 61, 62, 63. |
| 5 | M53, M57 | 61, 62, 63, 64. |
| 6 | M53, M58 | 61, 62, 64. |
| 7 | M54, M56 | 62, 63. |
| 8 | M54, M57 | 62, 63, 64. |
| 9 | M54, M58 | 62, 64. |
| 0 | M58 | 64. |

When the plunger 7 corresponding to the first dialed digit to be stored is depressed, make contacts $M_{106}$ are closed by the aforementioned switching mechanism and solenoid 97 is consequently energized through a path comprising a positive source of potential, capacitor 108, break contact $B_{8b}$, make contacts $M_{106}$, and make contacts $M_{Rg}$. As a result, pawl 93 is retracted from ledge 92, allowing jumping cam 83 to rotate. This rotation is transmitted through gear box 84 to heart shaped cam 85 which drives follower 86 upward, thereby axially displacing the recording heads along the drum.

Shortly after jumping cam 83 begins to rotate, timing lobe 94 forces closure of switch 95 for a measured period of time. Consequently, the potential applied to selected ones of the recording heads is reversed and negative current directed through the magnetizing coils of these selected heads, appropriate ones of make contacts $M_{Ra}$ through $M_{Rd}$, whichever of the make contacts $M_{52}$ through $M_{58}$ are actuated by the particular dialing plunger depressed, make contacts $M_{95a}$ and $M_{Rk}$, and resistor 114. For example, as shown on the above table, if the digit 2 plunger is depressed, make contacts M52 and M57 are operated. Therefore, negative current flows through the magnetizing coils of recording head 61 and make contacts $M_{Ra}$ and $M_{52}$ and through recording heads 63 and 64, make contacts $M_{Rc}$ and $M_{Rd}$, diodes 71 and 72, and make contacts M57. This negative current flows through the now moving recording heads for a period of time lasting only so long as switch 95, and hence make contacts $M_{95a}$, are operated. Accordingly, the areas of the drum traversed by the heads carrying negative current experience a reversal in magnetization. When make contact $M_{95a}$ open, positive current is reinstated in all heads, and the drum is once again magnetized in a so-called positive sense. If both the positive and negative current is high enough to saturate the drum, erasure of a previous recording will be accomplished automatically. In this manner the dialed digits are recorded in four-bit code groupings comprising magnetization reversals of uniform length disposed axially along the drum. Since digits are recorded by single magnetization reversals in each of four channels, the width of recording medium required to store a digit is considerably smaller than if the tones per se were being recorded.

Timing lobe 94 is positioned so as not to close make contacts $M_{95a}$ until heart shaped cam 85, and concomitantly the recording heads, reach maximum speed. This compensates for variations in the starting torque of the friction clutch 82 and, along with timing lobe 94, ensures that the magnetization reversals are always of substantially uniform length indepedent of the length of time during which a plunger 7 is held down. Solenoid 97 remains energized only until capacitor 108 becomes fully charged, a period of time shorter than one revolution of jumping cam 83. Accordingly, pawl 93 is snapped back to its original position by return spring 96, and prevents the jumping cam from making more than one revolution. Each time one of the dialing plungers 7 is depressed, the same sequence of events occurs until the complete directory number is stored on the drum.

Upon completion of recording, it is essential to release the record relay R before returning the heads to index position. If this is not done, positive current flowing through the magnetizing coils via resistors 73–76 and make contacts $M_{Ra-d}$ erases the number just recorded while the heads are traveling back toward index. As will be explained below, release of the R relay may be accomplished by either depressing reset key 9, or lifting the handset 1 from its cradle.

When recording a "split" directory number, i.e., a number having one or more prefix digits which must provide dial tone from the central office before the remainder of the number may be dialed, the procedure is exactly the same as outlined above, except that after the prefix digits are dialed, dial tone key 8 is depressed. When key 8 is depressed, a path comprising capacitor 108, and make contacts $M_{8b}$ and $M_{Rg}$ is established for energizing solenoid 97 (FIG. 4), and at the same time make contacts $M_{Ra}$ prepare, but do not complete, a path for negative current to head 61. Accordingly, when pawl 93 retracts, the recording heads are stepped along the drum, during which time switch 95, via make contacts $M_{95a}$, completes the negative current path to head 61. When capacitor 108 has charged, solenoid 97 is de-energized in the same manner as after a dialed digit has been stored. The remaining digits of the directory number are then dialed in the usual manner. Hence, a code group i.e., a magnetization reversal under head 61 only, is recorded at the point on the drum where dial tone from the central office must appear before out-dialing may be completed.

*Reset*

One method for returning the recording heads to index position along the drum without erasing the digits previously recorded is to depress reset key 9. Responsively, reset relay AR (FIG. 4) is energized through a path comprising a positive source of potential, break contacts $B_{102a}$ and make contacts $M_9$, and locks up over a path including make contacts $M_{ARa}$. Solenoid 97 is energized through a path comprising positive source of potential and make contacts $M_{ARb}$, and at the same time motor 81 (FIG. 3) is energized by supply 91 through make contacts $M_{ARc}$. Consequently, pawl 93 is retracted and heart shaped cam 85 is allowed to rotate to an angular position corresponding to index. As heart shaped cam 85 traverses the limit position on the way to index, in which position the recording heads are maximally displaced along the drum from their start position, lobe 101 of cam 99 operates break contacts $B_{103a}$, thereby opening the locking path formerly maintaining relay R energized. Consequently, make contacts $M_{Ra-d}$ open, removing current from the magnetizing coils of the recording heads and preventing erasure of the recorded number as the heads are returned to index. Upon cam 85 reaching the index position, switch 102 is operated by lobe 100 of cam 98 and as a result, break contacts $B_{102a}$ open. Accordingly, reset relay AR is de-energized which in turn opens make contacts $M_{ARb}$ and hence de-energizes solenoid 97. Thereafter, pawl 93 is returned to its original position arresting further rotation of cam 85. Make contacts $M_{ARc}$ also open to de-energize motor 81.

A second method for returning the recording heads from an intermediate position along the drum to index without erasing previously stored digits is to lift handset 1 from its cradle, thereby operating the switchhook mechanism. Accordingly, make contacts $M_{SHa}$ close and establish a path for energizing reset relay AR through make contacts $M_{Rf}$, break contacts $B_{DRb}$ and conductor 104. As explained above, energization of relay AR results in heart shaped cam 85, and hence the recording heads being returned to the index position.

*Simultaneous dial and record*

When it is desired to initiate an outgoing call and at the same time record the dialed number, the subscriber first lifts his handset from the cradle 2, thereby operating the switchhook mechanism and returning the recording heads to index if the reset key had not been depressed after the previous recording operation. Conveyor 4 is next shifted to a position in which the name plate intended to correspond to the called party appears in the window formed by bars 5, and concurrently, as previously noted, the axial segment on the surface of the magnetic drum corresponding to that name plate is rotated to a position adjacent to the recording heads.

The subscriber now depresses "dial and record" key 11 which in turn depresses record key 10. In response, both relay DR and record relay R are operated, the former through a path comprising a positive source of potential, break contacts $B_{ARa}$, make contacts $M_{11a}$, and the winding of relay DR and the latter through a path comprising positive source of potential, break contacts $B_{ARa}$, make contacts $M_{11a}$, $M_{11b}$, and make contacts $M_{10a}$ and the winding of relay R. The R relay locks over the path comprising positive source of potential, break contacts $B_{103a}$ and make contact $M_{Re}$, and the DR relay lock through make contacts $M_{DRa}$ and break contacts $B_{ARa}$. When record relay R operates at this time, that is to say, when the recording heads are at index position, solenoid 97 is energized through make contacts $M_{Rg}$ and $M_{102a}$. Accordingly, pawl 93 retracts, heart shaped cam 85 shifts the heads to the proper position for recording the first digit and cam 98 rotates to open switch 102. Hence, make contacts $M_{102a}$ open to interrupt the path energizing solenoid 97. Pawl 93 then returns to engage ledge 92, and further movement of the head is arrested. Thereafter, when the appropriate dial plungers 7 are depressed, the number is recorded in exactly the same manner as if the record button alone had been depressed. In addition, since the switchhook contacts 14 and 15 (FIG. 2) are now closed, the multifrequency dialing tones generated by oscillator 13 are also transmitted over the line to the central office.

To describe briefly the operation of multifrequency oscillator 13, assume that the plunger representing digit 4 is depressed. As shown by the preceding table, make contacts $M_{53}$ and $M_{56}$, and hence, crosspoints 53 and 56, close. As a result, a pair of tuned circuits are formed comprising as the first circuit capacitor 38 and sections L2, L3 and L4 of coil 36, and as the second circuit capacitor 39 and the entire coil 37. Before any of the dial plungers are depressed, a current path is provided comprising central office battery (not shown), switchhook contacts 14 and 15, coils 36 and 37, closed contacts 47, break contacts $B_{67a}$ and $B_{68a}$, and resistor 28. When any of the dial plungers 7 is depresesd, contacts 47 open, thereby interrupting current flow through coils 36 and 37 and shock exciting the various tuned circuits which are formed. As shown, coils 36 and 37 are inductively linked to coils 26, 27, 30 and 31 which form a series path between base electrode 21 and emitter electrode 22 of transistor 20. The resulting oscillations generated by transistor 20 are applied to the line via collector electrode 23 and conductor 24. For a more detailed description of both the structure and operation of multifrequency oscillator 13, reference is directed to the aforementioned Meacham application.

*Call*

Before initiating a call with the repertory dialer the recording heads should be returned to index position, if not already so situated, by either lifting the handset 1 or depressing reset key 9. Next, the name plate corresponding to the called party is positioned by knob 6 in the window formed by bars 5. This procedure stations the axial segment of the drum upon which the called party's number is stored adjacent to the recording heads. Call bar 12 is now depressed operating call relay CA (FIG. 4) over a path comprising a positive source of potential, make contacts $M_{SHa}$, break contacts $B_{Rf}$, make contacts $M_{12a}$ the winding of call relay CA and break contact $B_{ARb}$, and energizing motor 81 through make contact $M_{CAd}$. When the call bar 12 is released, solenoid 97 is energized through make contacts $M_{SHb}$ and $M_{CAc}$, and break contacts $B_{12a}$, $B_{DTc}$ and $B_{Rg}$. Accordingly, pawl 93 is retracted from ledge 92, and cams 83, 98, 99 and 85 begin to rotate.

As heart shaped cam 85 turns, follower 86 rises and the recording heads are axially displaced along the drum from the index position. Each time any of the heads encounters a magnetization reversal, a signal is induced in the magnetizing coil of that head and is transmitted through the appropriate one of break contacts $B_{Ra}$ through $B_{Rd}$ and amplifiers 77 through 80 to the corresponding relay 65 through 68. For example, as listed in the above table, if the first digit of the stored number is 9, heads 62 and 64, when traversing the digit-one channels of drum, simultaneously encounter magnetization reversals, whereas the other two digit-one channels of the drum, those in proximity to heads 61 through 63 during this interval, do not encounter such reversals. Accordingly, signals will be induced in the coils of heads 62 and 64, transmitted through break contact $B_{Rb}$ and $B_{Rd}$, amplified by amplifiers 78 and 80, and applied to operate relays 66 and 68.

Shortly after pawl 93 is retracted, lobe 94 of cam 83 operates switch 95 which closes make contacts $M_{95b}$ (FIG. 5). As a result, relay ON (FIG. 5) operates over a path comprising a positive source of potential, break contacts $B_{ARc}$ and $B_{67b}$, make contacts $M_{68b}$, the winding of relay ON and make contacts $M_{95b}$. Relay ON remains operated so long as make contacts $M_{95b}$ are closed, which is determined by the length of timing lobe 94. Accordingly, the operated decoding relays 66 and 68 (FIG. 4) remain operated over locking paths comprising a positive source of potential, make contact $M_{ON}$, and make contacts $M_{66a}$ and $M_{68a}$ for a period of time independent of the length of the segments recorded on the drum. As the heads traverse the length of the drum under the action of heart shaped cam 85 and follower 86, coded combinations of the decording relays 65 through 68 operate and release each time a magnetization reversal of the drum is encountered.

When heart shaped cam 85, and hence the recording heads, reach the outer or maximum displacement position, switch 103 is operated by lobe 101 of cam 99. When switch 103 operates break contacts $B_{103a}$ open to de-energize relay CA, and make contacts $M_{103a}$ are closed to establish a path via conductor 104 for operating reset relay AR, which is then locked up over a path comprising a positive source of potential, break contacts $B_{102a}$ and make contacts $M_{ARa}$. Accordingly, solenoid 97 is energized through an alternate path comprising make contacts $M_{ARb}$. When the index position is reached lobe 100 of cam 98 operates switch 102 which breaks the locking path for relay AR by virtue of break contacts $B_{102a}$, thereby de-energizing solenoid 97 to prevent further rotation of the heart shaped cam. Thus, one readout cycle of the register is completed.

The operation of decoding relays 65 through 68 (FIG. 3) is transformed into pairs of audio-frequency dialing signals by a matrix of make and break contacts connected to leads 40 through 46 of oscillator 13. If, for example, the digit 5 has been recorded on the drum, all four decoding relays operated concurrently as the recording heads sweep pass the code grouping recorded on the drum. Accordingly, make contacts $M_{65b}$ and $M_{66b}$ operated to connect conductor 50 with lead 41, thereby forming a tuned circuit comprising capacitor 38 and sections L2, L3 and L4 of coil 36. Also, the operation of make contacts $M_{67b}$ and $M_{68c}$ connects conductor 51 to lead 57, thereby forming a second tuned circuit comprising capacitor 39 and sections H2 and H3 of coil 37. At the same time, the operation of relays 67 and 68 operate break contacts $B_{67a}$ and $B_{68a}$ thereby interrupting the flow of current through coils 36 and 37 and shock exciting the newly formed tuned circuits. The resulting oscillations are transformer-coupled to the base and emitter circuits of transistor 20 by coils 26, 27, 30 and 31. Accordingly, the pair of frequencies characteristic of the aforementioned tuned circuits is applied to the line by the collector circuit of transistor 20. When the decoding relays release, the elements of the tuned circuits are decoupled and break contacts $B_{67a}$ and $B_{68a}$ once again become short circuit paths. The foregoing procedure occurs for each dialed digit in a directory number.

If the directory number to be dialed is of the type requiring an intermediate dial tone signal from the central office, the prefix is first outpulsed in the ordinary manner. That is to say, the name plate of the called party is positioned between bars 5, the handset lifted from its cradle, and call bar 12 then depressed. As explained above, this operation urges the recording heads along the drum, and the digits of the prefix are sensed and outpulsed as multifrequency tones in the manner described above. When the recording heads sense the code combination representing dial tone key 8, that is to say, a magnetization reversal under recording head 61 only, relay 65 operates, thereby closing make contacts $M_{65b}$ (FIG. 5). A current path is thus established comprising a positive source of potential, break contacts $B_{ARc}$, $B_{67b}$ and $B_{68b}$, make contacts $M_{65b}$, resister 111 and the winding of relay DT. Accordingly, relay DT operates and then locks through a path comprising a positive source of potential, break contact $B_{ARc}$, now operated make contact $M_{DTd}$, and break contacts $B_{12b}$. It will be observed from FIG. 4 that when relay DT operates, break contacts $B_{DTc}$ also operate to open the current path energizing solenoid 97. Hence, pawl 93 falls back to its original position against ledge 92 preventing further rotation of heart shaped cam 85, and thus any further motion of the recording heads relative to the drum.

When dial tone signal from the central office is received by the subscriber, indicating that dialing may continue, call bar 12 is again depressed and opens break contact $B_{12b}$ (FIG. 5) to interrupt the locking path of the DT relay. Accordingly, relay DT releases and break contacts $B_{DTc}$ close. As a result, solenoid 97 is re-energized, retracting pawl 93, the remainder of the recorded directory number is outpulsed and the call cycle completed in the manner previously described.

Although only a single embodiment of the invention has been described herein, it is to be understood that numerous other adaptations and modifications may be devised without departing from the spirit and scope of the invention.

What is claimed is:

1. A telephone call transmitter comprising, in combination, a digit selector mechanism for selecting digits, recording means, means responsive to the selection of a digit by said mechanism for recording indicia of the selected digit in said recording means, means for sensing said recorded indicia, means for generating oscillatory signal bursts, and means responsive to the operation of said sensing means for activating said oscillatory signal burst generating means in accordance with said recorded indicia.

2. A telephone call transmitter comprising, in combination, a digit selector mechanism for selecting digits, recording means, means responsive to the selection of a digit by said mechanism for recording indicia of the selected digit in said recording means, means for sensing said recorded indicia, multifrequency generating means, and means including said multifrequency generating means responsive to the operation of said sensing means for producing unique combinations of frequencies in accordance with said recorded indicia.

3. A telephone call transmitter comprising, in combination, a digit selector mechanism for selecting digits, means including said mechanism for producing combinations of electrical impulses severally representative of the selected digits, recording means, means for recording said impulses in said recording means, means for sensing said recorded impulses, multifrequency generating means, and means including said multifrequency generating means responsive to the operation of said sensing means for producing unique combinations of frequencies in accordance with said combinations of impulses.

4. A telephone call transmitter comprising, in combination, a digit selector mechanism for selecting digits, a plurality of switches associated with said mechanism, means for severally establishing a plurality of combinations of conducting paths through said switches in accordance with selected digits, a source of electrical energy, recording means, means for applying said energy from said source to said conducting paths, means for recording said energy conducted by said conducting paths, means for sensing said recorded energy, multifrequency generating means, and means including said multifrequency generating means and operative in response to said sensing means for producing combinations of frequencies in accordance with said recorded energy.

5. A telephone call transmitter comprising, in combination, a digit selector mechanism for selecting digits, an array of switches associated with said mechanism, recording means including a recording medium and a plurality of recording heads, means including said mechanism for operating distinct combinations of said switches in accordance with selected digits, means for energizing distinct combinations of said recording heads through the operated ones of said switches, thereby recording on said medium information indicative of which of said heads are energized, means for sensing the information recorded on said medium, multifrequency generating means, and means including said multifrequency generating means and operative in response to said sensing means for producing distinct combinations of frequencies in accordance with the combinations indicated by the sensed information.

6. A telephone call transmitter comprising, in combination, a digit selector mechanism for manually selecting digits, a multichannel recorder, means for selectively energizing the channels of said recorder in distinct combinations, said combinations respectively representing different selected digits, means for sensing the combinations of energized channels, multifrequency generating means, and means including said multifrequency generating means and responsive to said sensing means for producing distinct combinations of frequencies corresponding to the combinations of energized channels.

7. A telephone call transmitter comprising, in combination, a pushbutton dial array for selecting digits, a distinct pair of switches connected to be operated by each of said pushbuttons, a multichannel magnetic recorder including a recording head for each channel, means for energizing said recording heads in distinct pairs according to which pair of switches is operated, thereby varying the magnetization of the channels associated with the energized recording heads, means for sensing the variations in magnetization of said channels, multifrequency generating means, and means including said multifrequency generating means and responsive to said sensing means for producing distinct pairs of frequencies in accordance with the variation in magnetization of said channels.

8. A telephone call transmitter comprising, in combination, a pushbutton dial array for selecting digits, a multichannel magnetic recorder, means responsive to the individual operation of said pushbuttons for distinctly magnetizing distinct combinations of said channels, detecting means associated with each of said channels for sensing which of said channels is distinctly magnetized, switching means associated with each of said detecting means, means for operating combinations of said switching means when said detecting means senses a combination of distinctly magnetized channels, and multifrequency generating means, said generating means being connected to generate distinct combinations of frequencies determined by the combinations in which said switching means are operated.

9. A telephone call transmitter comprising, in combination, a pushbutton dial array for selecting digits, a multichannel magnetic recorder, means responsive to the individual operation of said pushbuttons for magnetizing distinct combinations of said channels, an individual detector associated with each channel for sensing when said channel is magnetized, a different relay associated with each of said detectors, means individually responsive to said detectors for operating said relays, a multifrequency generating device, and means responsive to the operation of a plurality of combinations of said relays for causing said device to generate corresponding combinations of frequencies.

10. A telephone call transmitter comprising, in combination, a selector mechanism for selecting digits, multifrequency generating means for generating a distinct combination of frequencies for each selected digit, a first group of electrical contacts included in said generating means operative to initiate selectively the generation of said combinations of frequencies, means responsive to the selection of a digit by said mechanism for selectively operating the contacts of said first group, a second group of electrical contacts electrically connected in parallel with said first group, recording means, means responsive to the selection of a digit by said mechanism for recording indicia of the selected digit in said recording means, means for sensing said recorded indicia, and means responsive to said sensing means for selectively operating the contacts of said second group in accordance with the recorded indicia.

11. A telephone call transmitter comprising, in combination; a pushbutton dial array for selecting digits; an oscillator; said oscillator comprising a first frequency determining circuit including a first capacitor and a first tapped inductor, and a second frequency determining circuit including a second capacitor and a second tapped inductor; a first group of contacts operative to connect selectively said first capacitor to a tap of said first inductor and to connect selectively said second capacitor to a tap of said second inductor, both in response to the selection of a single digit by said pushbutton array; a second group of contacts electrically connected in parallel with said first group; recording means; means responsive to the selection of a digit by said array for recording indicia of the selected digits in said recording means; means for sensing said recorded indicia; and a plurality of relays operative in response to said sensing means for selectively operating said second group of contacts in accordance with said recorded indicia.

12. A telephone call transmitter comprising, in combination, means for selecting digits to be transmitted, recording means, means responsive to said selecting means for recording in said recording means unipolar signals indicative of the selected digits, means for sensing recorded ones of said unipolar signals, and means responsive to said sensing means for translating recorded ones of said unipolar signals into corresponding oscillator signal bursts for transmission.

13. A telephone call transmitter comprising, in combination, a digit selector mechanism for selecting digits, recording means, means responsive to the selection of a digit by said mechanism for recording indicia of the selected digits in said recording means, means for sensing said recorded indicia, frequency generating means, activating means responsive to the operation of said sensing means for activating said frequency generating means in accordance with said recorded indicia, and means for regulating the time interval during which said frequency generating means is activated.

14. A telephone call transmitter comprising, in combination, a digit selector mechanism for selecting digits, recording means, means responsive to the selection of a digit by said mechanism for recording indicia of the selected digits in said recordng means, means for sensing said recorded indicia, frequency generating means, activating means responsive to the operation of said sensing means for activating said frequency generating means in accordance with said recorded indicia, and means independent of said recorded indicia for regulating the time interval during which said frequency generating means is activated.

15. A telephone call transmitter comprising, in combination, a digit selector mechanism for selecting digits, recording means, means responsive to the selection of a digit by said mechanism for recording indicia of the selected digits in said recording means, means for sensing said recorded indicia, frequency generating means, means responsive to the operation of said sensing means for initiating the activation of said frequency generating means in accordance with said recorded indicia, and means for sustaining the activation of said frequency generating means for a time interval independent of said recorded indicia.

16. A telephone call transmitter in accordance with claim 15 wherein said sustaining means comprises a timing device and a switch connected to said frequency generating activation means, said switch being operated by said timing device.

17. A telephone call transmitter in accordance with claim 16 wherein said timing device comprises a motor and an eccentric element driven by said motor, and said switch is operated by a follower element which rides said eccentric element.

18. A telephone call transmitter comprising, in combination, a digit selector mechanism for selecting digits, recording means, means responsive to the selection of a digit by said mechanism for recording indicia of the selected digits in said recording means, means for recording indicia of a condition in said recording means, sensing means for detecting said recorded indicia, means for operating said sensing means, call signal generating means, means responsive to the operation of said sensing means for activating said call signal generating means in accordance with said recorded indicia of selected digits, and means responsive to the detection by said sensing means of said indicia of a condition for terminating the operation of said sensing means.

19. A telephone call transmitter comprising, in combination, a digit selector mechanism for selecting digits, recording means, means responsive to the selection of a digit by said mechanism for recording coded signals in said recording means representing the selected digits, means for recording a coded signal in said recording means representing a condition, sensing means for detecting said recorded coded signals, means for operating said sensing means, multifrequency generating means, means responsive to the operation of said sensing means for activating said multifrequency generating means in accordance with said recorded signals representing digit, and means responsive to the detection by said sensing means of said recorded signal representing a condition for terminating the operation of said sensing means.

References Cited by the Examiner

UNITED STATES PATENTS

| | | | |
|---|---|---|---|
| 2,760,005 | 8/1956 | Williamson | 179—90 |
| 2,953,647 | 9/1960 | Johanson | 179—90 |
| 3,040,133 | 6/1962 | Kobler et al. | 179—90 |
| 3,041,412 | 6/1962 | Anderson | 179—90 |

ROBERT H. ROSE, *Primary Examiner.*

S. J. BOR, *Assistant Examiner.*